United States Patent [19]
DeRees

[11] 4,023,856
[45] May 17, 1977

[54] VEHICLE SUN SHIELD

[75] Inventor: Delbert Duane DeRees, Utica, Mich.

[73] Assignee: American Motors Corporation, Detroit, Mich.

[22] Filed: Apr. 2, 1976

[21] Appl. No.: 672,942

[52] U.S. Cl. .............................. 296/97 R; 248/278
[51] Int. Cl.² ........................................... B60J 3/02
[58] Field of Search ............ 296/97 C, 97 R, 97 D, 296/97 H; 248/278, 279, 293

[56] References Cited
UNITED STATES PATENTS

| | | | |
|---|---|---|---|
| 1,664,124 | 3/1928 | Lorenz | 248/279 |
| 1,913,277 | 6/1933 | Hoople | 248/276 |
| 1,942,663 | 1/1934 | Saunders | 248/293 |
| 1,944,468 | 1/1934 | Schaffner | 248/276 |
| 2,261,301 | 11/1941 | Smith | 296/97 C |
| 3,940,180 | 2/1976 | Altschul | 296/97 D |

*Primary Examiner*—Richard J. Johnson
*Attorney, Agent, or Firm*—Reising, Ethington, Barnard, Perry and Brooks

[57] ABSTRACT

A vehicle sun shield of the disclosure includes a planar support and a planar sun visor that are pivotally interconnected along hinge edges thereof by a friction hinge. The planar support has a triangular shape with one vertex thereof opposite its hinge edge pivotally mounted on the lower side of a vehicle roof above the area occupied by a driver or a front seat passenger. Side edges of the triangular support extend between its pivotally supported vertex and the opposite ends of its hinge edge. The planar sun visor is made from opaque material with its hinge edge of the same length as the hinge edge of the support. A pair of side edges of the sun visor extend from its hinge edge and respectively meet with the side edges of the support at a pair of spaced junctions. The mounting of the sun visor allows it to be positioned to shield a front seat occupant from the sun in any frontal or side direction. Cooperable Velcro strips mounted on the sun visor and the vehicle roof are utilized to store the sun shield in a position extending along the roof inwardly in a lateral direction from its vertical pivotal support on the roof.

8 Claims, 4 Drawing Figures

VEHICLE SUN SHIELD

BACKGROUND OF THE INVENTION

1. Field of the Invention

The present invention relates to a vehicle sun shield for shielding a vehicle front seat passenger from the sun in any frontal or side direction.

2. Description of the Prior Art

Conventional vehicle sun shields include a sun visor of an elongated rectangular shape located adjacent the front vehicle windshield header at the upper side of the windshield. These visors are customarily provided for both the driver and the front seat passenger. Usually, the outboard ends of the sun visors are mounted by associated supports to the windshield header so as to be movable from a storage position along the adjacent front roof edge to either a front position shielding the upper portion of the windshield or a side position shielding the upper portion of the adjacent side door window.

U.S. Pat. No. 1,664,124 Lorenz discloses a colored transparent screen that is mounted by an elongated frame suspended above the vehicle driver. The elongated frame is pivoted to the roof and has a pivot point intermediate a connection thereof to the screen. The connection to the screen is at a mid-point of an elongated edge of the screen so that this screen edge projects from the frame in opposite directions.

Other non-conventional sunshields or the like are disclosed by U.S. Pat. Nos. 1,552,199; 1,695,357; and 1,913,277.

SUMMARY OF THE INVENTION

The present invention relates to vehicle sun shield including a planar support and a planar sun visor pivoted to each other about hinge edges thereof by a friction hinge. The planar support has a triangular shape with one vertex thereof opposite its hinge edge designed for mounting on a vehicle roof above a front seat occupant for movement about a generally vertical axis. Side edges of the triangular support extend between its pivotally supported vertex and opposite ends of its hinge edge. The planar sun visor is made from opaque material with its hinge edge of the same length as the hinge edge of the support. Side edges of the sun visor extend from opposite ends of its hinge edge and meet with the side edges of the support at spaced junctions. The sun visor is supported so as to be movable about a horizontal axis of the friction hinge and about the vertical axis in a manner that shields a front seat occupant from the sun in any frontal or side direction.

In the preferred embodiment disclosed, the vertex of the triangular support pivoted to the roof is rounded, and the side edges of the sun visor extend parallel to each other and also meet with an outer edge that is parallel to the visor hinge edge so as to give the visor a generally rectangular shape. Cooperable attachment portions on the sun visor and the associated vehicle roof are utilized to store the sun shield in a laterally extending direction with respect to the vehicle. Velcro strips are preferably utilized as the attachment portions and store the sun shield so that it extends inwardly from the vertical pivot axis to the roof. Thus, when two shields are utilized to provide shielding of the front seat passenger as well as the driver, the shields are stored with their visors extending toward each other from the vertical pivots thereof to the roof.

The objects, features and advantages of the present invention are readily apparent from the following detailed description of the preferred embodiment taken in connection with the accompanying drawings.

DETAILED DESCRIPTION OF THE PREFERRED EMBODIMENT

Figure 1:
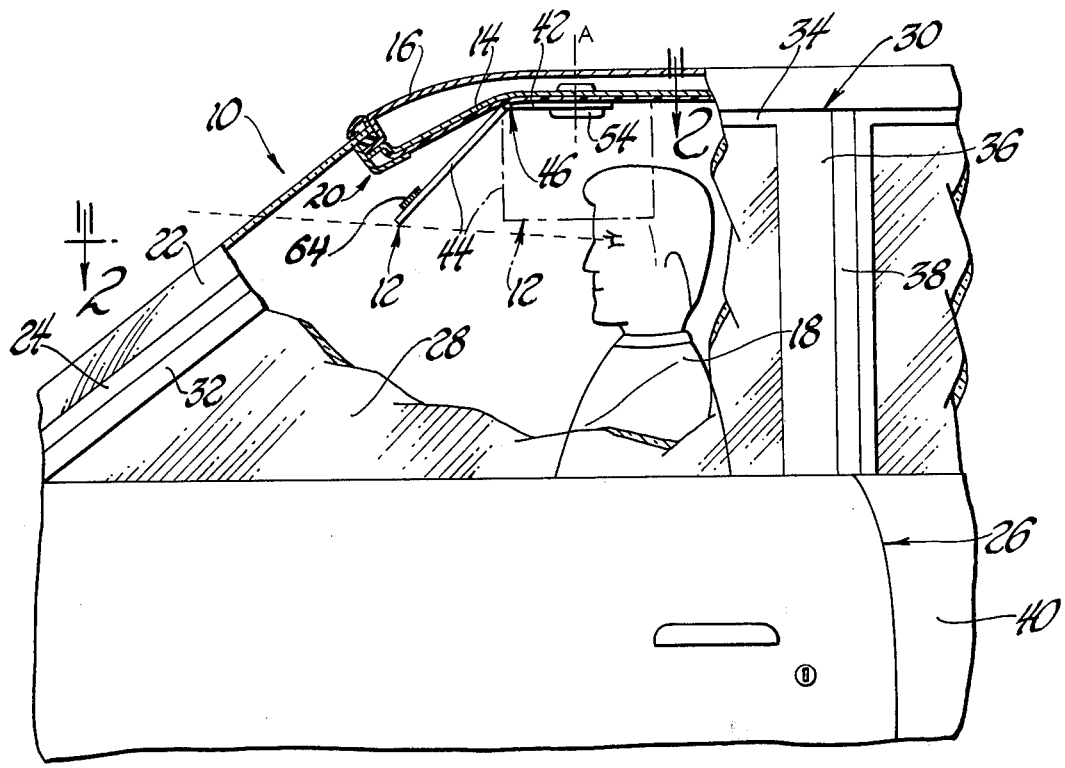
FIG. 1 is a side elevation view partially broken away in section of a vehicle body that incorporates a sun shield according to the present invention.

Referring to FIG. 1 of the drawings, a vehicle body generally indicated by 10 includes a sun shield 12 constructed according to the present invention. The sun shield is mounted on a headliner 14 of a vehicle roof panel 16 above and just slightly forward of the vehicle driver 18. The forward edges of the headliner and roof panel 14 and 16 are secured to each other at a windshield header 20 located at the upper edge of the windshield 22. The lateral side edges of the windshield 22 are bounded by a pair of windshield pillars 24, only one shown. A side door 26 of the vehicle body is mounted for movement in a conventional manner between open and closed positions about a generally vertical axis at its forward end. A vertically movable window 28 of the door is received within an upper window frame 30 which has an inclined forward portion 32 that is positioned alongside the windshield pillar 24 in the door closed position shown. An upper portion 34 of the window frame is positioned alongside the lateral edge of the roof panel in the closed position and a generally vertical rearward portion 36 of the frame is positioned alongside a door pillar 38. The door pillar 38 extends vertically between the vehicle roof panel 16 and a rear quarter panel 40.

With additional reference to the other figures of the drawings, the sun shield 12 includes a generally planar support 42 and a generally planar sun visor 44 that are pivotally interconnected to each other by a friction hinge 46 along respective hinge edges 48 and 50. The planar support 42 has a generally triangular shape with one vertex 52 thereof located opposite its hinge edge 48. Vertex 52 is pivotally supported about a vertical pivot axis A on the roof headliner 14 by a double-headed pin 54 and has a rounded shape that is concentric with the center of pin 54. A pair of side edges 56 of the triangular support 42 connect the rounded vertex 52 with the opposite ends of the support hinge edge 48.

Figure 2:
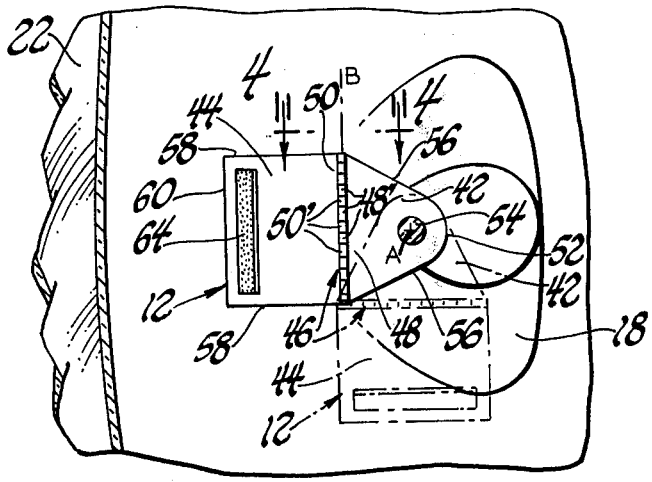
FIG. 2 is a top plan view taken in section generally along line 2—2 of FIG. 1.

As best seen in FIG. 2, the sun visor 44 has a rectangular shape and its hinge edge 50 has the same length as the hinge edge 48 of triangular support 42. Opposite side edges 58 of sun visor 44 extend from opposite ends of the visor hinge edge 50 where they meet at spaced junctions with the side edges 56 of triangular support 42. The side visor edges 58 extend to an outer visor edge 60 that is parallel with the hinge edge 50.

Figure 4:
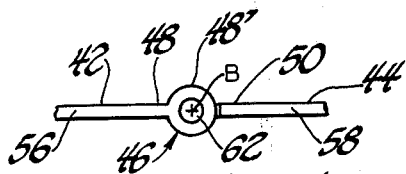
FIG. 4 is a view taken along line 4—4 of FIG. 2 showing a friction hinge that interconnects a support and a sun visor of the sun shield.

As seen by combined reference to FIGS. 2 and 4, the friction hinge 46 pivotally interconnects the triangular support 42 and the sun visor 44 about a horizontal axis B. This hinge 46 includes apertured hinge portions 48' and 50' that are arranged on the hinge edges 48 and 50 of the support and the sun visor in an alternating relationship. A pintle 62 is received by the hinge portions 48' and 50' with a slight interference fit so that the sun visor 44 will be maintained in any angular position about axis B to which it is pivotally moved by the driver 18.

As seen by combined reference to FIGS. 1 and 2, the manner in which the sun visor 44 is pivotally supported for angular movement about vertical axis A and for pivotal movement about horizontal axis B allows the sun shield 12 to shield the driver's eyes from the sun in any frontal or side direction. For example, if the sun is shining from the driver's left side, the sun shield 12 is moved about axis A to the phantom line position shown in FIGS. 1 and 2 and, if it is shining from the right side, the shield is moved in the opposite direction. Likewise, if the sun is shining from a low angle, the visor 44 is pivoted downwardly about axis B to a lower position that it would be positioned in if the sun were shining from a higher angle.

As seen in FIG. 2, a suitable attachment portion such as a Velcro strip 64 is secured to the upper side of the sun visor 44 adjacent its outer edge 60. Another cooperable attachment portion such as a Velcro strip 66, FIG. 3, on the roof headliner 14 secures the Velcro strip 64 with the sun shield 12 positioned along the roof in a laterally extending direction projecting inwardly from the vertical pivot axis A.

Figure 3:
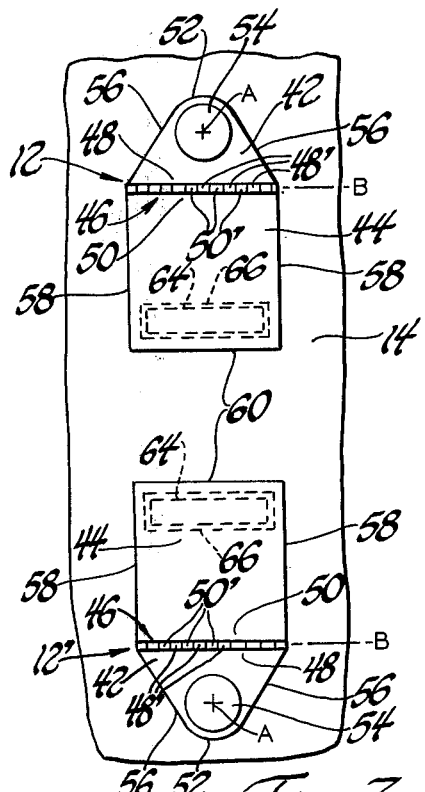
FIG. 3 is a bottom plan view looking upwardly from within the vehicle passenger compartment to show a pair of the sun shields for the driver and front seat passenger, with the shields shown in a storage position.

As shown in FIG. 3, in addition to the sun shield 12 for the driver 18 the vehicle 10 includes a sun shield 12' for the front seat passenger. The front seat passenger sun shield 12' is of the same construction as the driver sun shield and the two sun shields extend toward each other in the stored position shown in FIG. 3. The windshield header 20, FIG. 1, thus has an unobstructed aesthetically appealing appearance with the sun shields in their stored position. Also, these sun shields do not have to be made with both right and left-hand models as is the case with conventional rectangular sun shields utilized in vehicles presently.

While a preferred embodiment of the sun shield has herein been disclosed, those skilled in the art will recognize various alternative designs and embodiments for practicing the present invention as defined by the following claims.

I claim:

1. A vehicle sun shield comprising: a planar support of a generally triangular shape; means for mounting the triangular support adjacent one vertex thereof for movement about a vertical axis on the lower side of a vehicle roof above a front seat occupant in a parallel relationship to the roof; said triangular support including a hinge edge opposite said one vertex thereof and a pair of side edges extending from said hinge edge to said one vertex; said side edges of the triangular support being located in an oblique relationship to the hinge edge thereof and meeting with the hinge edge thereof to define the other two vertices of the support; a planar sun visor of opaque material; said sun visor including a hinge edge of the same length as the hinge edge of the support and a pair of side edges extending away from the hinge edge thereof; and a friction hinge pivotally interconnecting the hinge edges of the support and the sun visor with the side edges thereof meeting at a pair of spaced junctions coincident with said other two vertices of the support, said sun visor being supported by the hinge and the mounting means for movement about a horizontal axis and for angular movement in a manner that shields a front seat occupant from the sun in any frontal or side direction.

2. A sun shield as in claim 1 wherein said one vertex of the triangular support is rounded.

3. A sun shield as in claim 1 wherein the sun visor has a rectangular shape.

4. A sun shield as in claim 1 wherein the sun visor includes an attachment portion for securing the visor in a storage position.

5. A sun shield as in claim 4 wherein the attachment portion comprises Velcro.

6. A sun shield as in claim 1 wherein the friction hinge includes aligned holes on each of the hinge edges of the support and the sun visor, and a pintle received within the holes with an interference fit.

7. In a vehicle body including a roof covering an occupant compartment thereof and a windshield header located at the front extremity of the roof, a sun shield comprising: a planar support of a generally triangular shape; means mounting the triangular support adjacent one vertex thereof for movement about a vertical axis on the lower side of the vehicle roof above a front seat occupant area in a parallel relationship to the roof; said triangular support including a hinge edge opposite said one vertex thereof and a pair of side edges extending from said hinge edge to said one vertex; said side edges of the triangular support being located in an oblique relationship to the hinge edge thereof to define the other two vertices of the support; a planar sun visor of opaque material; said sun visor including a hinge of the same length as the hinge edge of the support and a pair of parallel side edges extending away from the hinge edge thereof in a perpendicular relationship thereto; a friction hinge pivotally interconnecting the hinge edges of the support and the sun visor with the side edges thereof meeting at a pair of spaced junctions coincident with said other two vertices of the support; said sun visor being supported by the hinge and the mounting means for movement about a horizontal axis and for angular movement in a manner that shields a front seat occupant from the sun in any frontal or side direction; and releasable attachment means for storing the sun visor along the roof extending laterally from the vertical axis about which the support member is mounted on the roof so as to give the windshield header an unobstructed appearance in an aesthetically appealing manner.

8. A vehicle body as in claim 7 which includes a pair of the sun shields for respectively shielding a driver and a front seat passenger, and said attachment means including Velcro on the visors of the sun shields and on the vehicle body roof at locations inboard from the respective vertical axes thereof so that each visor is stored in an inwardly extending lateral direction.

* * * * *

UNITED STATES PATENT OFFICE
CERTIFICATE OF CORRECTION

Patent No. 4,023,856                    Dated May 17, 1977

Inventor(s) Delbert Duane DeRees

It is certified that error appears in the above-identified patent and that said Letters Patent are hereby corrected as shown below:

Column 4, line 40 after "hinge" insert --edge--.

Signed and Sealed this

Fourth Day of October 1977

[SEAL]

Attest:

RUTH C. MASON
Attesting Officer

LUTRELLE F. PARKER
Acting Commissioner of Patents and Trademarks